United States Patent
Schevardo et al.

(10) Patent No.: US 10,752,130 B2
(45) Date of Patent: Aug. 25, 2020

(54) MONITORING MODULE FOR A SEAT OF A PASSENGER AIRCRAFT, MONITORING DEVICE AND PASSENGER AIRCRAFT

(71) Applicant: DIEHL AEROSPACE GMBH, Ueberlingen (DE)

(72) Inventors: Dirk-Achim Schevardo, Roethenbach (DE); Lothar Trunk, Weibersbrunn (DE); Ehler Rager, Ueberlingen (DE); Stefan Mueller-Diveky, Schoeneck (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/341,289

(22) PCT Filed: Oct. 17, 2017

(86) PCT No.: PCT/EP2017/001222
§ 371 (c)(1),
(2) Date: Apr. 11, 2019

(87) PCT Pub. No.: WO2018/077467
PCT Pub. Date: May 3, 2018

(65) Prior Publication Data
US 2020/0047639 A1   Feb. 13, 2020

(30) Foreign Application Priority Data
Oct. 29, 2016   (DE) ................. 10 2016 012 912

(51) Int. Cl.
*B60N 2/00*   (2006.01)
*B64D 11/00*   (2006.01)
*B64D 11/06*   (2006.01)

(52) U.S. Cl.
CPC ........ *B60N 2/002* (2013.01); *B64D 11/00155* (2014.12); *B64D 11/06* (2013.01)

(58) Field of Classification Search
CPC .............. B60R 22/48; B60R 21/01546; B60R 21/01516; B60R 21/01532; B60R 2022/4816; B60N 2/002; B64D 11/06
See application file for complete search history.

(56) References Cited

U.S. PATENT DOCUMENTS

2006/0032979 A1   2/2006   Mitchell et al.
2008/0068220 A1   3/2008   Giesa et al.
(Continued)

FOREIGN PATENT DOCUMENTS

DE   29613291 U1   11/1996
DE   102004025319 A1   12/2005
(Continued)

OTHER PUBLICATIONS

International Search Report dated Jan. 4, 2018 issued in PCT/EP2017/001222.

*Primary Examiner* — Hongmin Fan
(74) *Attorney, Agent, or Firm* — Scully, Scott Murphy and Presser

(57) ABSTRACT

A monitoring module (6) for a seat (10) of a passenger aircraft (2), which seat (10) contains at least one element (12a-g) having at least two states (Z1,2), comprises at least one sensor (14a-g) for the element (12a-g), having state information (16) corresponding to the current state (Z1,2), a readout unit (18) having a communication channel (20) for the state information (16) to the sensor (14a-g) and a communication interface (22) for the state information (16) to a monitoring unit (8) of the passenger aircraft (2). The sensor (14a-g) is a camera or a capacitive seat occupancy sensor.

(Continued)

Figure 1:
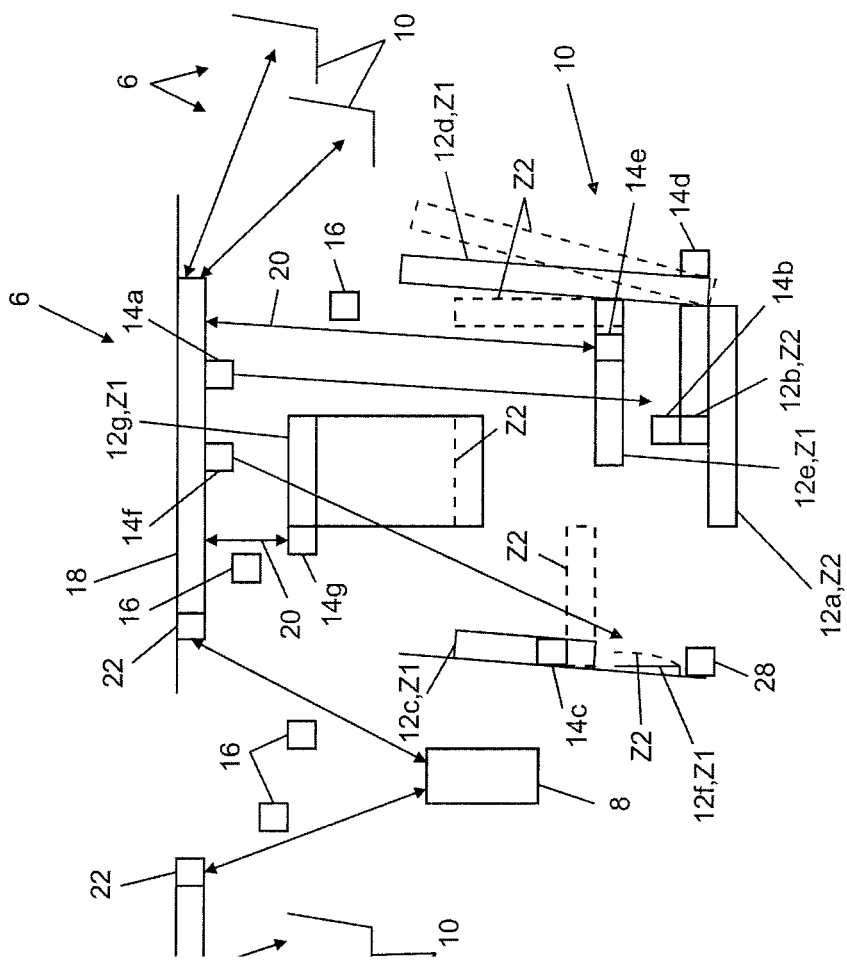

A monitoring device (4) for a passenger aircraft (2) contains monitoring modules (6) and a monitoring unit (8), which is configured for at least two of the monitoring modules (6) together.

A passenger aircraft (2) contains a monitoring module (6) and/or a monitoring device (4).

14 Claims, 2 Drawing Sheets

(56) References Cited

U.S. PATENT DOCUMENTS

| | | | |
|---|---|---|---|
| 2010/0308166 A1* | 12/2010 | Bovelli | B64D 11/06 244/122 B |
| 2011/0166751 A1 | 7/2011 | Bauer et al. | |
| 2013/0154319 A1* | 6/2013 | Nouvel | B64C 13/00 297/217.3 |
| 2014/0125355 A1* | 5/2014 | Grant | B64D 11/062 324/629 |
| 2018/0319503 A1* | 11/2018 | Sidambarom | B60N 2/002 |

FOREIGN PATENT DOCUMENTS

| | | |
|---|---|---|
| DE | 102006030193 A1 | 1/2008 |
| DE | 102006042299 B4 | 4/2011 |
| DE | 102009054698 A1 | 6/2011 |
| DE | 102014204926 A1 | 10/2015 |
| DE | 202015007107 U1 | 2/2017 |
| EP | 2730479 A1 | 5/2014 |
| WO | WO 2009/062614 A2 | 5/2009 |

\* cited by examiner

MONITORING MODULE FOR A SEAT OF A PASSENGER AIRCRAFT, MONITORING DEVICE AND PASSENGER AIRCRAFT

The invention relates to a monitoring module for a seat of a passenger aircraft, to a monitoring device for a passenger aircraft and to a passenger aircraft.

Passenger aircraft comprise a multiplicity of seats for carrying passengers. Each seat in this case has one or more elements which can occupy different states. An element is for example a safety belt, which can occupy the states unfastened (passenger not belted) or fastened (passenger belted). Another element is a backrest, which can occupy the states "set upright" or "inclined backward".

During flight operation, various elements must occupy different states: for example, during takeoff and landing of the aircraft the safety belts need to be fastened and the backrests need to be set upright. At present, such a status or state of aircraft seats, or seat locations, particularly whether the passenger is strapped in, needs to be checked visually by the cabin crew. This is highly susceptible to error and leads to many injuries in everyday operation.

DE 10 2006 042 299 B4 discloses a monitoring method for monitoring a seat state for an aircraft. A seat occupancy state of a seat element is measured by means of a seat occupancy sensor and a belt fastening state of the seat element is measured with the aid of a belt fastening sensor. The seat occupancy state and the belt fastening state are communicated to a monitoring device. The monitoring device generates a warning signal in the event of a combination of a predetermined seat occupancy state and a predetermined belt fastening state.

WO 2009/062614 A2 discloses a seat arrangement for an aircraft, having a plurality of sensor modules in order to sense at least the state and/or the occupancy of the seat arrangement and deliver this information to a processing unit arranged centrally in the aircraft. A transmission/reception unit assigned to the seat arrangement is provided, the sensor modules being configured wirelessly and autonomously in terms of energy delivering information to the transmission/reception unit via a sensor radio link, in order to communicate this information to the processing unit using the transmission/reception unit.

DE 10 2014 204 926 A1 discloses a method for communicating information from a passenger seat to a cabin system of a passenger aircraft, the passenger seat having a radio unit and an energy harvesting device for electrically supplying the radio unit, the radio unit transmitting a corresponding control signal to the cabin system by radio as a result of the reception of a signal from a sensor for recording a seat state variable and/or from a passenger-actuated switch for switching on/off a reading light or for calling cabin crew.

DE 10 2004 025 319 A1 discloses a seat status display system for passenger compartments of aircraft and vehicles, which comprises a multiplicity of sensor arrangements, each of which is used to record the state of a seat and generate corresponding seat status signals. The sensor arrangements respectively comprise a seat occupancy sensor for recording the occupancy of a seat and a belt sensor for recording a fastened state of a safety belt of the seat. An operating and display unit is furthermore provided, which is electrically connected by means of a bus and the sensor arrangements, in order to receive the associated seat status signals from each sensor arrangement and display them graphically for each seat. Furthermore, a corresponding seat for passengers of aircraft and vehicles and an associated operating and display unit for seats in aircraft and vehicles is described.

The object of the present invention is to propose an improvement in relation to seats of passenger aircraft.

The object of the invention is achieved by a monitoring module as claimed in patent claim 1 for a seat of a passenger aircraft. The seat comprises at least one element. The element can occupy at least two states to be monitored. The monitoring module contains at least one sensor. Each of the sensors is assigned to one of the elements in order to record its state. The sensor is sensitive for the state of the element, and can thus detect its state. During operation, the sensor comprises state information. The state information corresponds to the current (i.e. at the moment of the recording of the state) state of the element. The monitoring module contains a readout unit. The readout unit is connected to the sensor by means of a communication channel. The communication channel is used for transmitting the state information between the sensor and the readout unit. The readout unit comprises a communication interface. The communication interface is used for transmitting the state information to a monitoring unit of the passenger aircraft.

The state information may be forwarded in the sensor and from the sensor directly or indirectly, for example in a post-processed form. The monitoring unit is, in particular, a cabin management system of the passenger aircraft.

The readout unit may in this case be configured for a plurality of monitoring modules together. These modules thus have only a single common readout unit, i.e. they share the latter. The readout unit may therefore be configured for a plurality of seats, for example next to one another in a row, together. All the monitoring modules of this row (for example 3 seats) then have only a single common readout unit.

According to the invention, at least one of the sensors is a camera or a capacitive seat occupancy sensor. The capacitive seat occupancy sensor is, in particular, a capacitive proximity sensor. With the latter, a change in an electric field, or in a capacitance, which is due to the introduction of an object or of a person into the monitoring region, particularly into the region of the seat, is recorded by measurement technology. A camera may, in particular, be used in order to check whether a seat, or its seat surface, is occupied, a folding table is folded up or down, a backrest is in an upright or backwardly tilted position, an armrest is folded up or down, a window shade is open or closed, or whether there is an object in a storage pocket or the latter is empty. For the state detection in this case, automatic image processing of the camera image may in particular be used. As a sensor, a camera is economical and easy to handle.

According to the invention, in a monitoring unit which is remote from the element or sensor, in particular accessible centrally in the passenger aircraft (for a multiplicity of seats), it is possible to check or view the states of elements of seats. Therefore, a multiplicity of seats may be checked for the respective state of their elements, in particular at a central position, without having to go to the respective seats and having to inspect them visually. Furthermore, sensor information about the state is available which is generally less susceptible to error than visual or subjective detection of the state of the relevant element by cabin crew. Thus, inspection errors due to visual observation are substantially precluded.

In one preferred embodiment of the invention, the sensor is configured to be sensitive for the following elements, their respective possible states being indicated in brackets. The elements may be a seat surface of a seat of the seat location (seat surface or seat location occupied or not by a passenger) or a belt buckle (unfastened, fastened) or a folding table (folded up, folded down) or a backrest (set upright or inclined backward) or an armrest (folded down or folded up) or a storage pocket (empty or filled) or a window shade element (opened, closed).

Such elements, or their states, may be essentially important for the safety of passengers (in particular during takeoff and landing of the passenger aircraft). In particular, the elements should be in a respectively predetermined state at particular times, for example during takeoff and landing (for example belt buckle fastened, folding table folded up, backrest upright, armrest folded down). According to the invention, these states can now be checked on a monitoring unit, or verified by the cabin crew, in particular centrally, or for a plurality of seats together, without having to go to the individual seats.

In one preferred embodiment, at least one of the sensors is integrated in the readout unit. This variant is recommendable, in particular, for sensors in the form of cameras or capacitive sensors, since these can then be supplied with energy for their operation together with the readout unit or from the readout unit. Furthermore, this provides a compact and integrated readout unit having sensor devices, which can be installed simply and rapidly in the aircraft.

In one preferred embodiment, the readout unit can be arranged over the seat. In the intended installation state, it is thus installed above a seat. This may also be done obliquely above. This is in particular favorable when the readout unit carries a camera or a capacitive seat sensor, since in this way the corresponding sensor devices are or can particularly advantageously be aimed at the seat.

"Above" or "over" refers to the intended mounting state of the monitoring module in the aircraft, and the fact that the aircraft is oriented horizontally.

In one preferred embodiment, the communication channel is a wireless channel. An RFID channel is recommended in particular as such a channel, in which case the state information may be stored in the sensor in an RFID-compatible storage element. There is then an RFID transmission/reception unit in the readout unit. The sensor may be configured passively in relation to the communication, i.e. for readout it is externally supplied with energy wirelessly, for example from the readout unit or its RFID unit. The readout unit is in this case simpler and less elaborate to supply with on-board voltage of the passenger aircraft than the sensor. This applies particularly when a readout unit is responsible for a plurality of seats together.

In one preferred embodiment, the sensor is supplied with energy wirelessly in order to record the state. To this end, for example, wireless energy input may take place from the outside into the sensor, in order to activate the corresponding sensor devices, record the state and, for example, store it in a permanent memory. This permanent memory may then be read out at a later time. The wireless energy input only needs to be carried out in such a way that there is enough energy in the sensor at the time when the current state is intended to be recorded. Cabling of the sensor is therefore not necessary.

In one preferred embodiment, the sensor is a switch generator. Such a switch generator operates according to the principle of energy harvesting, i.e. it obtains its energy required for operation merely by its mechanical actuation. The mechanical energy is in this case converted into electrical energy. In particular, the sensor comprises an integrated memory which can then be read out by means of the communication channel, in particular an RFID channel. Such sensors require no external energy input or supply, but operate autonomously in terms of energy technology.

In one preferred embodiment, the communication interface is a wireless interface. Data cabling between the readout unit and the monitoring unit is obviated, so that installation of the monitoring module in the passenger aircraft is possible particularly simply and with little cabling outlay. Such an interface is, for example, a WLAN connection.

In one preferred embodiment, the monitoring module contains a central unit. The communication channel between the sensor and the readout unit then extends via the central unit. In particular, the central unit may be arranged at a seat of the seat location, and in particular may be integrated therein. In particular, it is used for temporary storage of state information of elements of the seat location, or seat. The central unit thus forms, in particular, a data collector, which collects and stores the state information of all connected sensors time. Independently of the collection of the state information, this information can then be read out at any desired time by the readout unit from the central unit via the relevant communication channel. In particular, a switch generator without a memory, which generates the state information at the moment of actuation and delivers it to the central unit, may then be used as the sensor, although the state information is stored in the central unit. The central unit may thus from a central memory in the seat for a plurality of or all the state information items of the seat. It is therefore possible to use a simplified sensor devices at the seat in conjunction with the central unit.

In one preferred variant of this embodiment, a section of the communication channel between the sensor and the central unit is configured differently to a section of the communication channel between the central unit and the readout unit. In particular, the communication channel between the sensor and the central unit may thus be cabled. Sensors, for example switch generators without a memory, are connected by cable to the central unit. The communication of the state information from the sensor to the central unit is therefore possible in a particularly simple way. The cabling may, in particular, be carried out in the seat of the seat location. Corresponding sensors for the belt buckle, backrest and armrest are generally installed in the seat anyway, so that a compact unit of a sensor and central unit is obtained here. The communication channel from the central unit to the readout unit may then again be wireless, in particular an RFID channel, the energy supply for the RFID transmission coming from the readout unit. The central unit therefore likewise does not itself need to be supplied with energy, since the energy for storing the state information comes from the sensor, and that for the readout from the readout unit. The section of the communication channel between the central unit and the readout unit may be a channel used by a plurality of sensors together.

In one preferred embodiment, the monitoring module contains a display element for at least one state information item, which is recorded in the monitoring module. Such a display element may, in particular, be visible from the seat and thus display feedback about states of the elements of the seat to the passenger. In particular, the display element may display the status of the belt buckle, and individually tell the passenger of the need to fasten the belt buckle. It is also possible to display whether a storage pocket still contains objects, so that the passenger cannot forget corresponding objects stored in the storage pocket when leaving the aircraft. The passenger may, for example, also be individually told to set their backrest upright, to fold the folding table up, etc. Because of the individual display element, other passengers are not inconvenienced, and furthermore the passenger generally feels that he or she is being particularly effectively personally addressed in this way.

In one preferred variant of this embodiment, the display element can be activated and deactivated from outside the monitoring module. Thus, for example, the display may take place only in time intervals between landing approach and exit, in order to inform the passenger of objects still remaining in the storage pocket. The indications to fasten the belt buckle, etc., may for example also displayed only in time intervals of landing and takeoff.

The object of the invention is also achieved by a monitoring device for a passenger aircraft. This contains a multiplicity of monitoring modules according to the invention and at least one monitoring unit. The monitoring unit is configured for at least two of the monitoring modules together. In particular, the monitoring unit is configured for all monitoring modules of the monitoring device together. The monitoring unit thus forms a single and therefore central monitoring unit for a plurality or all of the seats which are equipped with the monitoring modules. Thus, the states of the corresponding elements of all connected seats can be checked at one position, and it is possible to only speak specifically to those passengers to bring their elements into corresponding states.

The monitoring device and at least some of its embodiments, as well as the respective advantages, have already been explained correspondingly in connection with the monitoring module according to the invention.

The object of the invention is also achieved by a passenger aircraft as claimed in patent claim 14, having at least one monitoring module according to the invention and/or having at least one monitoring device according to the invention.

The passenger aircraft and at least some of its embodiments, as well as the respective advantages, have already been explained correspondingly in connection with the monitoring module according to the invention and/or the monitoring device according to the invention.

The invention is based on the following discoveries or considerations, wherein in this context embodiments of the invention which correspond to combinations of the above-mentioned embodiments and/or possibly also include embodiments not yet mentioned, are also referred to as the "invention".

According to the invention, seat (location) status monitoring, in particular wireless monitoring, for an aircraft (passenger aircraft) is provided. The seat and/or buckle and/or occupancy status of the seat is reported by means of, in particular wireless, sensor devices and readout apparatuses to a monitoring unit and therefore, in particular, to the cabin crew.

According to the invention, display of objects still remaining in the seat region (at the seat location) is also made possible.

The invention is based on the idea of further increasing the safety of passengers in passenger aircraft, and in particular of ensuring that the passenger is belted and the seat of the seat location is in a safe position.

The invention is based on the discovery that, particularly in aircraft seats of business and first class, there are many storage compartments which are sometimes also somewhat covered or concealed. The passenger may put their paraphernalia in them, or forget their own objects. On arrival, things are often forgotten or looked for under time pressure, since the paraphernalia have been put somewhere. The idea of the invention is to detect whether there is still something in the storage compartments and inform the passenger of this.

The invention is based on the discovery that the status of aircraft seats and whether the passenger is belted currently needs to be checked visually by the cabin crew. This is highly susceptible to error and leads to many injuries in everyday operation. There is currently no possibility of detecting objects in the storage compartments by sensor devices.

The invention is based on the idea of supplying sensors, in particular wireless sensors, in or on the belt buckle, the backrest and the storage table with energy by means of a readout apparatus, in particular above the passenger. The sensors report the respective state (for example fastened/unfastened). The readout apparatuses (readout unit) per seat row (a plurality of seat locations) communicate by radio with a central unit (monitoring unit), which informs the cabin crew. The central unit likewise monitors the seat occupancy wirelessly. Passengers who do not buckle up can correspondingly be identified and spoken to specifically. Many injured passengers associated with diverted landings, delays and aborted flights can be avoided. In addition, a change in the storage pockets is monitored (one or more cameras). The passenger is informed at a suitable time (for example landing approach) that there is still something in the storage pocket. The indication is turned off automatically when the object is removed.

The invention makes do with only minimal alteration of the cabling in the aircraft, and can therefore be retrofitted very easily. Compared with cabled seat occupancy detection, the invention requires less comprehensive cabling measures.

The invention permits a new system function in the scope of a cabin management system, which may be jointly used as a monitoring unit.

In a first embodiment of the invention, there is one readout unit above per seat row. These readout units communicate on the one hand with a cabin management system (monitoring unit) and on the other hand with wireless state sensors in the seats. These state sensors are interrogated by the readout unit and to this end supplied wirelessly with energy. Furthermore, a seat occupancy function is integrated in the readout unit with the aid of a capacitive sensor. This sensor establishes whether the respective seat is occupied by a person. As an alternative, the seat occupancy may be detected by means of a suitable camera.

The wireless state sensors provide information about:
seatbelt unfastened or fastened
folding table folded in or out
backrest in upright position
armrest down
window shade open (optional).

This information is made available to the flight attendants. This allows on the one hand a very rapid review of the state of the respective seats, but in particular whether the instructions to fasten the belt are followed properly. Furthermore, in particular, the belt's not being fastened is intended to be indicated by flashing of the belt fastening sign in the respective seat row.

Because of the wireless structure of the system, simple installation in the seat locations (seats) or belts is intended to take place.

In a second embodiment of the invention, in each seat a central unit collects the state of the seat and reports this to a readout unit which is located above the seat row. These readout units communicate on the one hand with a cabin management system, and on the other hand with wireless state sensors in the seats. These state sensors are interrogated by the readout unit and to this end supplied wirelessly with energy. Furthermore, a seat occupancy function is integrated in the readout unit with the aid of a capacitive sensor. This sensor establishes whether the respective seat is occupied by a person. As an alternative, the seat occupancy may be detected by means of a suitable camera.

In a third embodiment of the invention, there is one readout unit above per seat row. These readout units communicate on the one hand with a cabin management system and on the other hand with a wireless state sensor in the belt buckle. This state sensor is interrogated by the readout unit and to this end supplied wirelessly with energy.

The camera integrated in the readout unit detects the following states:
seat occupied,
folding table folded in or out,
backrest in upright position,
armrest down,
window shade open,
state change in storage pockets.

In order to permit reliable detection of the seat occupation status even under low light conditions, the camera is in particular also sensitive in the near infrared range and/or equipped with corresponding illumination means.

As an additional function, state changes in the seat pouches/storage pockets may be monitored. The change of status in seat pouches/storage pockets is detected and an indication is given to the passenger during the landing approach that there are possibly still personal objects in the seat (seat location).

According to the invention, a display of objects still remaining is also provided. According to the invention, objects are detected by the system when they are placed in pouches, storage compartments, for example of an aircraft seat. Before leaving the aircraft, it is displayed to the user that these pouches still contain objects which they should take with them.

The invention is based on the idea of detecting when something is placed in a storage compartment. In particular when switching a trigger, for example the signal for landing approach, an indication is given by a display, light, etc., that there is still something in this storage compartment. As soon as the part has been removed from the storage compartment, the display is reset.

According to the invention, there is thus more convenience for the user.

In particular, one or more cameras are fitted, which record the region of the storage compartment. The empty storage compartment is used as a reference. As soon as the reference changes, something has been put in. Because of this delta, relatively simple camera technology can be used.

Figure 2:
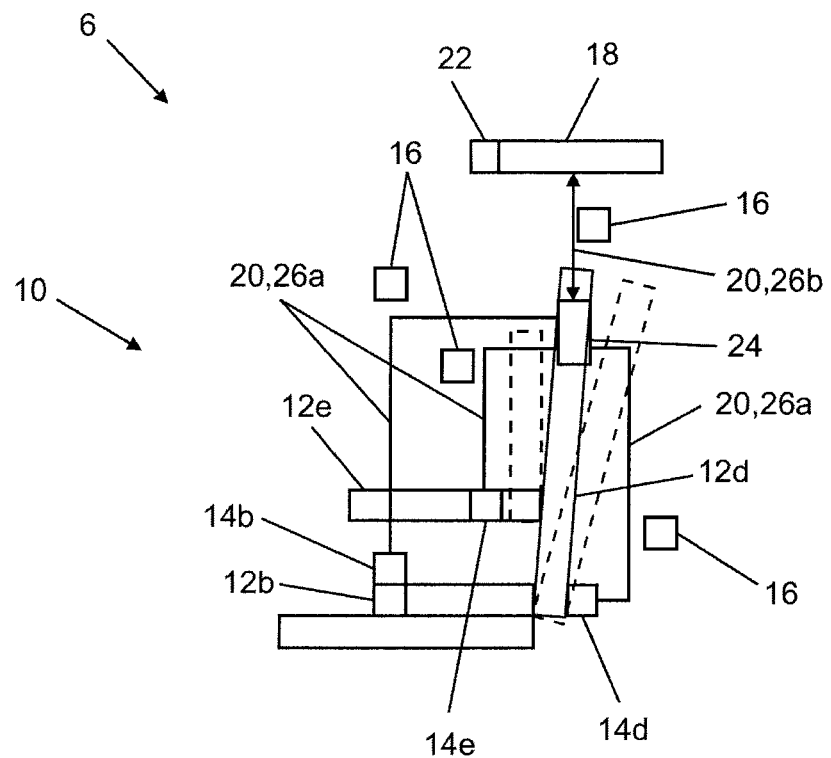

Other features, effects and advantages of the invention may be found in the following description of a preferred exemplary embodiment of the invention and the appended figures. In these, in a schematic outline diagram:

FIG. 1 shows a detail of a passenger aircraft having a monitoring device, or monitoring module, FIG. 2 shows an alternative embodiment of a monitoring module.

FIG. 1 shows a detail of a passenger aircraft 2, which contains a monitoring device 4. The monitoring device 4 contains a multiplicity of monitoring modules 6, of which only one is represented in detail. The monitoring device 4 contains a monitoring unit 8, which is configured in this case centrally for all monitoring modules 6 together.

The passenger aircraft 2 contains a multiplicity of seats 10, only one of which is represented in detail. The seat 10 comprises elements 12a to g. Each of the elements 12a to g can respectively occupy two states Z1, 2, which are indicated as follows in brackets after the elements: the elements are 12a a seat surface (Z1 occupied, i.e. a passenger has taken their place on the seat, Z2 unoccupied), 12b belt buckle (Z1 fastened, Z2 unfastened (not represented))—an associated safety belt is only indicated in FIG. 1, 12c a folding table (Z1 folded up, Z2 (represented by dashes) folded down), 12d a backrest (Z1 set upright, Z2 inclined backward (represented by dashes)), 12e an armrest (Z1 folded down, Z2 folded up (represented by dashes)), 12f a storage pocket (Z1 empty, Z2 filled (represented by dashes)), 12g a window shade element (Z1 pushed up, Z2 pulled down (represented by dashes)).

Each of the elements 12a to g is assigned a sensor 14a to g. The sensors 14a to g record the respective states Z1, 2 and respectively output state information 16 which is current at the moment of the recording (indicated symbolically in the figures) and corresponds to the current state Z1, Z2, or have this or contain this. Sensor 14a is a capacitive seat occupancy sensor, sensors 14b to e and 14g are switch generators. Sensor 14f is a video camera.

The monitoring module 6 contains a readout unit 18, which is connected by means of a respective communication channel 20 (for the sake of clarity, not all are indicated) to a respective one of the sensors 14a to g. The communication channels 20 are used to transmit the state information 16 from the sensors 14a tog to the readout unit 18. The monitoring module 6 furthermore comprises a communication interface 22. This is used to transmit the state information 16 from the readout unit 18 to the monitoring unit 8.

Sensors 14a and 14f are integrated into the readout unit 18. Sensors 14b to e and 14g are supplied with energy wirelessly. These are switch generators which themselves generate their energy needed for operation from their actuation. The corresponding sensors 14 thus operate according to the principle of energy harvesting. During operation, the relevant sensors 14 generate sufficient energy to store the state information 16 in a permanent storage element internal to the sensor. From this storage element, the state information 16 is read out on demand or in response to interrogation by RFID via the communication channel 20. To this end, a small energy input is generated in the respective sensor 14 wirelessly by the readout unit 18, which suffices as transmission energy, in order to read the state information 16 out from the sensor memory and transmit it by radio to the readout unit 18.

The transmission from the readout unit 18 to the monitoring unit 8 is carried out by means of the communication interface 22 in the form of a wireless interface, in this case by WLAN or WIFI.

The readout unit 18 is also used as a readout unit 18 for further monitoring modules 6 of further seats 10, which is indicated here only symbolically. The overall three seats 10 with a common readout unit 18 form a continuous seat row of three in the passenger aircraft 2.

The readout unit 18 is arranged over the relevant seats 10 to which it is assigned. The communication channel 20 is a wireless communication channel, in this case an RFID channel.

Indicated symbolically is a further readout unit 18, which is used to exchange the corresponding state information 16 with the same monitoring unit 8. The further readout unit 18 is again responsible as a common readout unit 18 for three seats 10 (seat row of three) with in total three monitoring modules 6.

The monitoring unit 8 is a cabin management system of the passenger aircraft 2. There, state information 16 of all seats 10 of the passenger aircraft 2 are collected and shown on a display (not explained in more detail or represented) and can be seen by the flight attendants. The state information 16 is in this case post-processed, for example in the form of colored dots for each of the seats. Thus, all states Z1, Z2 of all elements 12 of all seats 10 can be seen centrally at the position of the monitoring unit 8.

A display element 28, which displays the state information Z1, 2 of the element 12*f* is likewise part of the monitoring module 8. The display element 28 can be seen from the seat 10. Thus, a passenger using the seat 10 is informed that in state Z2 to there are still objects in element 12*f* (storage pocket). The passenger therefore cannot forget to take these with them when leaving the passenger aircraft 2. The display element 28 can be activated, so that it displays the state Z1 or Z2, from outside the monitoring module 6, in this case from the monitoring unit 8 in the form of the cabin management system, or can be deactivated so that it displays nothing. At the start of the flight, it is for example deactivated in order not to disturb the passengers with unnecessary information. Shortly before leaving the passenger aircraft 2, for example starting from the landing approach, on the other hand, the passengers are informed by the activated display element 28 of the possible presence of objects in the storage pocket.

FIG. 2 shows a detail of an alternative monitoring module 6. This contains a central unit 24. The communication channels 20 of the sensors 14*b,d,e* arranged in the seat of the seat location 10 extend in this case via the central unit 24. A section 26*a* of the respective communication channel 20 between the sensor 14 and the central unit 24 is in this case configured in a cabled fashion, and therefore differs from the embodiment of the second section 26*b* between the central unit 24 and the readout unit 18, which is again configured wirelessly as an RFID channel. The sensors 14*b,d,e* are switch generators in this case as well, but do not contain an internal permanent storage element. One of the latter is contained centrally for the three sensors 14*b,d,e* in the central unit 24. During operation, or when actuated, the switch generators again generate enough energy to record the state information 16 and transmit it to the central unit 24, and store it permanently there. From the central unit 24, or its memory, the state information 16 of all three sensors 14*b,d,e* is read out together by RFID.

LIST OF REFERENCES 2 passenger aircraft
4 monitoring device
6 monitoring module
8 monitoring unit
10 seat
12*a-g* element
14*a-g* sensor
16 state information
18 readout unit
20 communication channel
22 communication interface
24 central unit
26*a,b* section
28 display element
Z1,2 state

The invention claimed is:

1. A monitoring module for a seat of a passenger aircraft, the seat comprising at least one element which can occupy at least two states to be monitored, having at least one sensor, which is assigned to one of the elements and is sensitive to the state of the latter, and which during operation comprises state information corresponding to the current state, having a readout unit, which is connected to the sensor by means of a communication channel for transmitting the state information and which comprises a communication interface for transmitting the state information to a monitoring unit of the passenger aircraft, wherein the sensor is a camera and/or a capacitive seat occupancy sensor, and wherein the readout unit is arranged over the seat.

2. The monitoring module as claimed in claim 1,
wherein
the sensor is configured sensitively for an element which is a seat surface or a belt buckle or a folding table or a backrest or an armrest or a storage pocket or a window shade element.

3. The monitoring module as claimed in claim 1, wherein the sensor is integrated in the readout unit.

4. The monitoring module as claimed in claim 1, wherein the communication channel is a wireless channel.

5. The monitoring module as claimed in claim 1, wherein the sensor is supplied with energy wirelessly in order to record the state.

6. The monitoring module as claimed in claim 1, wherein the sensor is a switch generator.

7. The monitoring module as claimed in claim 1, wherein the communication interface is a wireless interface.

8. The monitoring module as claimed in claim 1, whererin the monitoring module contains a central unit, and the communication channel extends between the sensor and the readout unit via the central unit.

9. The monitoring module as claimed in claim 8,
wherein
a section of the communication channel between the sensor and the central unit is configured differently to a section of the communication channel between the central unit and the readout unit.

10. The monitoring module as claimed in claim 1, wherein the monitoring module contains a display element for at least one state information item recorded in the monitoring module.

11. The monitoring module as claimed in claim 10,
wherein
the display element can be activated and deactivated from outside the monitoring module.

12. A monitoring device for a passenger aircraft, having a multiplicity of monitoring modules as claimed in claim 1, and having at least one monitoring unit which is configured for at least two of the monitoring modules together.

13. A passenger aircraft having at least one monitoring module as claimed in claim 1 and having at least one monitoring device having a multiplicity of monitoring modules as claimed in claim 1, and having at least one monitoring unit which is configured for at least two of the monitoring modules together.

14. A passenger aircraft having at least one monitoring module as claimed in claim 1 or having at least one monitoring device having a multiplicity of monitoring modules as claimed in claim 1, and having at least one monitoring unit which is configured for at least two of the monitoring modules together.

* * * * *